(«12») United States Patent
Isogai

(10) Patent No.: US 9,371,587 B2
(45) Date of Patent: Jun. 21, 2016

(54) METHOD OF MANUFACTURING FUEL SYSTEM PART AND FUEL SYSTEM PART

(71) Applicant: OTICS CORPORATION, Aichi (JP)

(72) Inventor: Eiji Isogai, Hekinan (JP)

(73) Assignee: OTICS CORPORATION, Aichi (JP)

( * ) Notice: Subject to any disclaimer, the term of this patent is extended or adjusted under 35 U.S.C. 154(b) by 354 days.

(21) Appl. No.: 14/212,078

(22) Filed: Mar. 14, 2014

(65) Prior Publication Data

US 2014/0199480 A1  Jul. 17, 2014

Related U.S. Application Data

(62) Division of application No. 13/291,207, filed on Nov. 8, 2011, now abandoned.

(30) Foreign Application Priority Data

Nov. 12, 2010  (JP) .................... 2010-254007

(51) Int. Cl.
C23C 18/54 (2006.01)
C25D 9/02 (2006.01)
C23C 18/16 (2006.01)
(Continued)

(52) U.S. Cl.
CPC ............. *C23C 18/54* (2013.01); *C23C 18/1608* (2013.01); *C23C 18/1646* (2013.01); *C23C 18/32* (2013.01); *C25D 9/02* (2013.01); *C25D 13/04* (2013.01); *F02M 37/0017* (2013.01); *F02M 37/0064* (2013.01); *F02M 61/166* (2013.01); *F02M 61/168* (2013.01); *F02M 69/465* (2013.01); *F16L 58/08* (2013.01); *F16L58/1072* (2013.01); *F02M 2200/8069* (2013.01); *F02M 2200/9038* (2013.01)

(58) Field of Classification Search
CPC   C23C 18/54; C23C 18/1608; C23C 18/1646; C23C 18/32; C25D 13/04; C25D 9/02; F02M 37/0017; F02M 37/0064; F02M 61/166; F02M 61/168; F02M 69/465; F02M 2200/8069; F02M 2200/9038; F16L 58/08; F16L 58/1072
See application file for complete search history.

(56) References Cited

U.S. PATENT DOCUMENTS 2,633,631 A   4/1953   Horvitz
5,770,642 A   6/1998   Kanato et al.
(Continued)

FOREIGN PATENT DOCUMENTS

JP   11-117826   4/1999
JP   2006-161067   6/2006
(Continued)

OTHER PUBLICATIONS

European Search Report issued Mar. 21, 2012 in corresponding European Patent Application No. 11008839.0.

*Primary Examiner* — Kishor Mayekar
(74) *Attorney, Agent, or Firm* — Wenderoth, Lind & Ponack, L.L.P.

(57) ABSTRACT

A method manufactures a fuel delivery pipe including a crude metal made of forged iron, a nickel-phosphorus plating layer formed on an inner surface of the crude metal, and a nonmetal paint film formed on an outer surface of the crude metal. The method includes coating the outer surface of the crude metal with paint to form the paint film, machining the crude metal with the paint film formed thereon to form a machined surface inside the crude metal, and electroless plating the machined crude metal in nickel-phosphorus plating solution to form the nickel-phosphorus plating layer on the machined surface.

4 Claims, 10 Drawing Sheets

(51) Int. Cl.
*C23C 18/32* (2006.01)
*C25D 13/04* (2006.01)
*F02M 37/00* (2006.01)
*F02M 61/16* (2006.01)
*F02M 69/46* (2006.01)
*F16L 58/08* (2006.01)
*F16L 58/10* (2006.01)

(56) References Cited

U.S. PATENT DOCUMENTS

| | | |
|---|---|---|
| 6,190,780 B1 | 2/2001 | Shoji et al. |
| 6,406,611 B1 | 6/2002 | Engelhaupt et al. |
| 6,790,481 B2 | 9/2004 | Bishop et al. |
| 6,994,779 B2 | 2/2006 | Heimann et al. |
| 7,094,324 B2 | 8/2006 | Uchidoi et al. |
| 8,062,496 B2 | 11/2011 | Tomantschger |
| 2002/0183421 A1 | 12/2002 | Kojima et al. |
| 2003/0096906 A1 | 5/2003 | Tazzia et al. |
| 2007/0272559 A1 | 11/2007 | Ho |
| 2011/0014478 A1 | 1/2011 | Sagisaka et al. |
| 2011/0162751 A1 | 7/2011 | Fitzgerald et al. |
| 2011/0257321 A1 | 10/2011 | Peretolchin et al. |

FOREIGN PATENT DOCUMENTS

| | | |
|---|---|---|
| JP | 2010-159676 | 7/2010 |
| WO | 03/010356 | 2/2003 |
| WO | 2009/119747 | 10/2009 |
| WO | 2010/050566 | 5/2010 |

METHOD OF MANUFACTURING FUEL SYSTEM PART AND FUEL SYSTEM PART

CROSS REFERENCE TO RELATED APPLICATION

This application claims priority from Japanese Patent Application No. 2010-254007 filed on Nov. 12, 2010. The entire content of this priority application is incorporated herein by reference.

TECHNICAL FIELD

The present invention relates to a method of manufacturing a fuel system part, and the fuel system part.

BACKGROUND

A known fuel delivery pipe having a fuel path is one of fuel system parts for internal combustion. A surface on the fuel path is plated with nickel-phosphorus, etc. In general, nickel-phosphorus plating is used for protecting a wall surface defining a fuel path against corrosion by alcohol-mixed fuel such as biofuel. On the other hand, the outer surface of the fuel delivery pipe is rust proofed as a countermeasure against salt corrosion. A known method of manufacturing such a fuel delivery pipe will hereinafter be illustrated with reference to FIGS. 8 through 10.

First, a crude metal 1 is cut out from a forged iron rod (a forging cutting step). Second, the crude metal 1 is drilled through its axis such that a round bore 2 is formed inside the crude metal 1 (a machining step). Third, the crude metal 1 with the round bore 2 is impregnated in nickel-phosphorus plating solution and is electroless plated. By this plating, a nickel-phosphorus plating layer 3 is formed both on an inner periphery of the round bore 2 and on the outer periphery of the crude metal 1 (a nickel-phosphorus plating step). Fourth, rubber plugs 4 are fitted tightly into opening ends of the crude metal 1 to prevent paint from entering the inside of the crude metal 1. That is, the inside of the crude metal 1 is masked (a masking step). Finally, the outer periphery of the crude metal 1 is coated with a paint film 5 (an outer-periphery coating step). Thus, a fuel delivery pipe 6 having the nickel-phosphorus plating layer 3 on the inner periphery of the crude metal 1 and the paint film 5 on the outer periphery of the crude metal 1 is manufactured.

As illustrated in FIG. 10, the fuel delivery pipe 6 has four layers including the nickel-phosphorus plating layer 3, the crude metal 1, the nickel-phosphorus plating layer 3, and the paint film 5, in that order from the fuel path 7. That is, two nickel-phosphorus plating layers 3 are necessarily formed on the fuel delivery pipe 6. However, the nickel-phosphorus layer plating 3 on the periphery that does not contact fuel is needless. Therefore, while nickel is one of rare metals, a larger quantity of nickel is required. Furthermore, the fuel path 7 needs to be sealed with the rubber plugs 4 before the outer periphery is coated with the paint film 5. That is, an extra step (the masking step) is needed prior to the outer-surface coating step. Therefore, reduction in use of nickel and, further, avoiding the masking step are important problems for reducing the cost of manufacturing the fuel delivery pipe 6.

Thus, there is a need for a fuel delivery pipe that needs less nickel and does not need the masking step, thereby reducing the manufacturing cost.

SUMMARY

An illustrative aspect of the present invention is a method of manufacturing a fuel system part. The fuel system part includes a crude metal made of forged iron, a nickel-phosphorus plating layer formed on an inner surface of the crude metal, and a nonmetal paint film formed on an outer surface of the crude metal. The method includes the steps of: coating the outer surface of the crude metal with paint to form the paint film; machining the crude metal with the paint film formed thereon to form a machined surface inside the crude metal; and electroless plating the machined crude metal in nickel-phosphorus plating solution to form the nickel-phosphorus plating layer on the machined surface.

In the context of the present invention, the fuel system part may be any one of: a fuel tank, a fuel pipe from the fuel tank to an internal combustion, a fuel delivery pipe for delivering fuel to a plurality of injectors, etc. In other words, any part having a contact surface to contact fuel is the fuel system part. Furthermore, the fuel is not limited to alcohol-mixed fuel that is so-called biofuel; the fuel may be either alcohol fuel or non-alcohol fuel.

With the manufacturing method, the crude metal is coated with the nonmetal film and, thereafter, is machined to form the machined surface. Accordingly, the nickel-phosphorus plating layer is formed only on the machined surface. Therefore, no masking step is needed. Furthermore, because the number of the formed nickel-phosphorus plating layer is only one, a lower quantity of nickel is needed. As a result, the fuel system part can be manufactured at lower cost.

In general, a forged surface of a forging (the surface will hereinafter be referred to as a "crude-metal forged surface") has a surface roughness larger than that of a machined surface. Accordingly, the crude-metal forged surface has a surface area greater than that of the machined surface. Therefore, if the crude-metal forged surface and the machined surface are plated in same conditions, the crude-metal forged surface has a lower plating thickness. Furthermore, the crude-metal forged surface more easily forms an oxide film, etc. This considerably affects oxidation-reduction reaction that occurs at an interface between plating solution during plating. With the above-described manufacturing method, in contrast, the nickel-phosphorus plating layer is formed only on the machined surface. Therefore, a plating film having a uniform thickness and little pinholes can be formed in the nickel-phosphorus plating step.

DETAILED DESCRIPTION OF THE INVENTION

Embodiment

Figure 1:
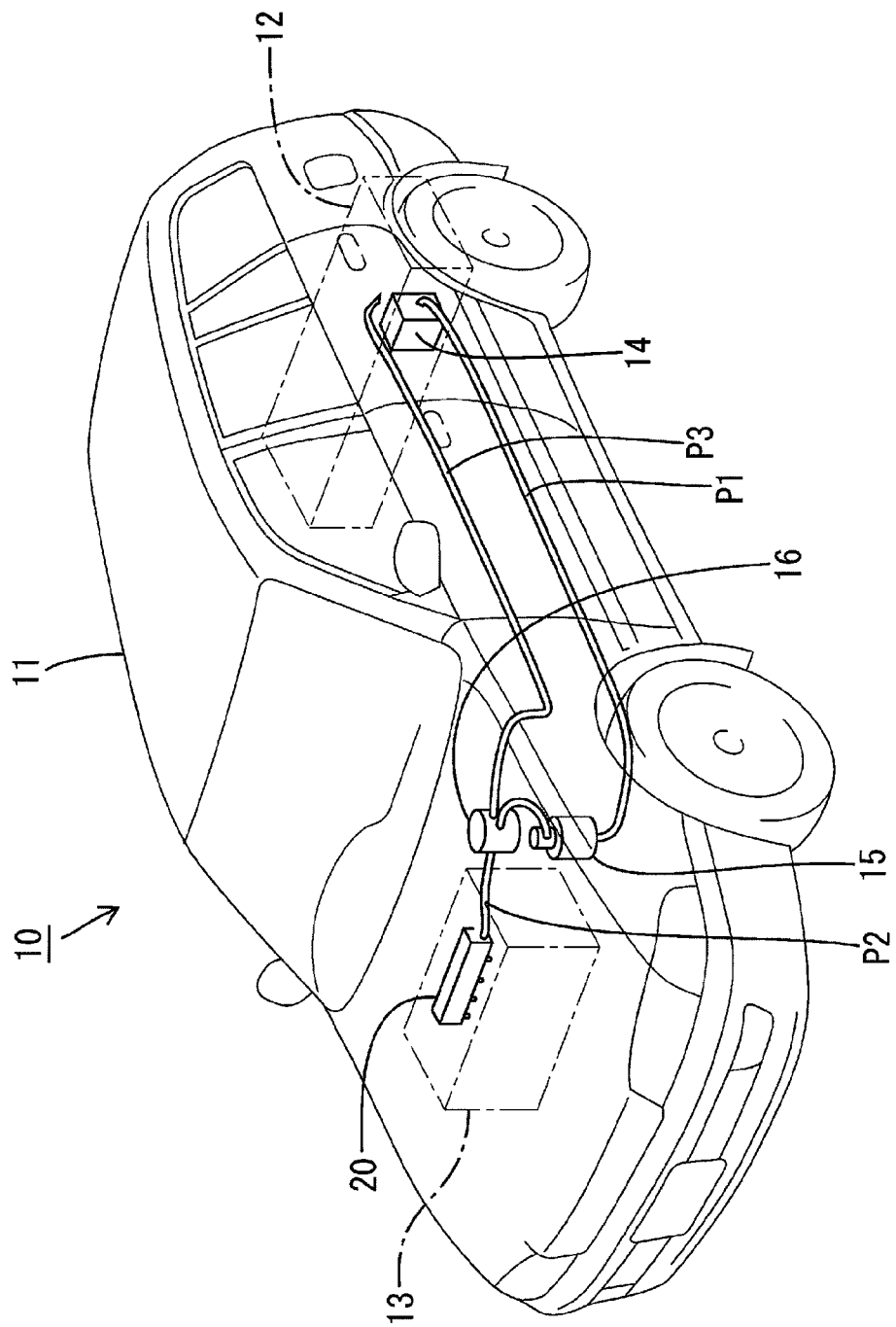
FIG. 1 is a perspective view illustrating a configuration of fuel system parts of an embodiment.

An embodiment will be described with reference to FIGS. 1 through 7. An overall configuration of fuel system parts according to the present invention will first be described with reference to FIGS. 1 through 4. FIG. 1 is a perspective view illustrating the fuel system parts mounted to a vehicle body 11 of a vehicle 10. The fuel system parts are parts that have respective contact surfaces that contact fuel between a fuel tank 12 and an engine 13. Specifically, the fuel system parts are configured by the fuel tank 12, a fuel supply pump 14, a fuel transfer pipe P1, a fuel transfer pipe P2, a fuel return pipe P3, a filter 15, a pressure regulator 16, etc.

The fuel tank 12 is disposed in a rear area in the vehicle body 11. The engine 13 is disposed in a front area in the vehicle body 11. The fuel supply pump 14 is disposed in the fuel tank 12 and pressurizes fuel to pump it to the engine 13. The fuel pressurized by the fuel supply pump 14 is transferred through the fuel transfer pipe P1 from the fuel tank 12 toward the engine 13. The fuel transferred through the fuel transfer pipe P1 is filtered by the filter 15. The filtered fuel is passed through the pressure regulator 16 and the fuel transfer pipe P2 and is supplied to the fuel delivery pipe 20. The pressure regulator 16 regulates pressure of the fuel to be supplied to the fuel delivery pipe 20 at a predetermined pressure.

The fuel referred to in this embodiment is so-called biofuel, etc., which is alcohol fuel that contains alcohol. Because the alcohol-mixed fuel is metal corrosive, each fuel system part for use with the fuel is generally nickel-phosphorus plated as a countermeasure against corrosion. On the other hand, the outer periphery of the fuel system part is rust proofed as a countermeasure against salt corrosion. In this embodiment, the outer periphery of the fuel delivery pipe 20 is rust proofed by coating with nonmetal paint, which forms a paint film 40. This will be described later.

Figure 2:
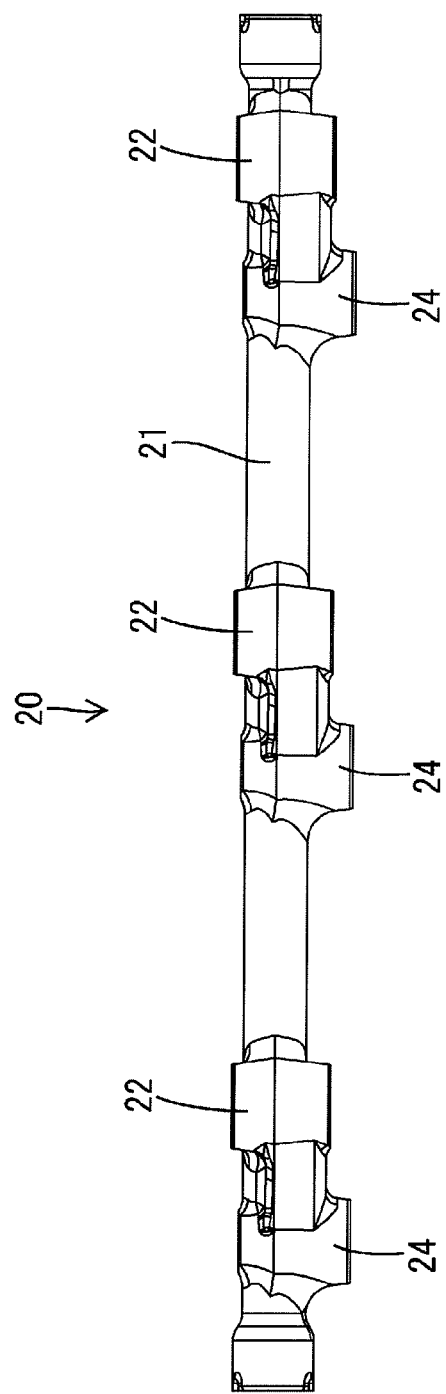
FIG. 2 is a front view illustrating a fuel delivery pipe.
Figure 3:
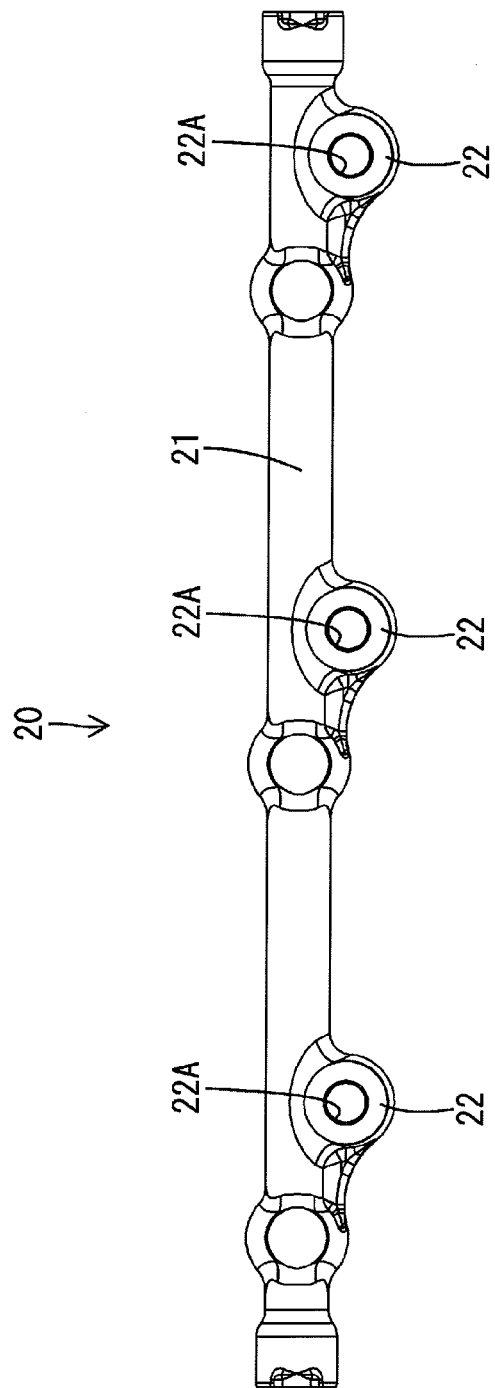
FIG. 3 is a plan view illustrating the fuel delivery pipe.

As illustrated in FIG. 2, the fuel delivery pipe 20 includes a pipe body 21 having a cylindrical shape. As illustrated in FIG. 3, a plurality of bolt connecting portions 22 project laterally from the pipe body 21. The bolt connecting portions 22 are arranged at equal intervals along the length of the pipe body 21. Each bolt connecting portion 22 has a bolt hole 22A therethrough so as to allow a bolt (not shown) to be inserted therein.

Figure 4:
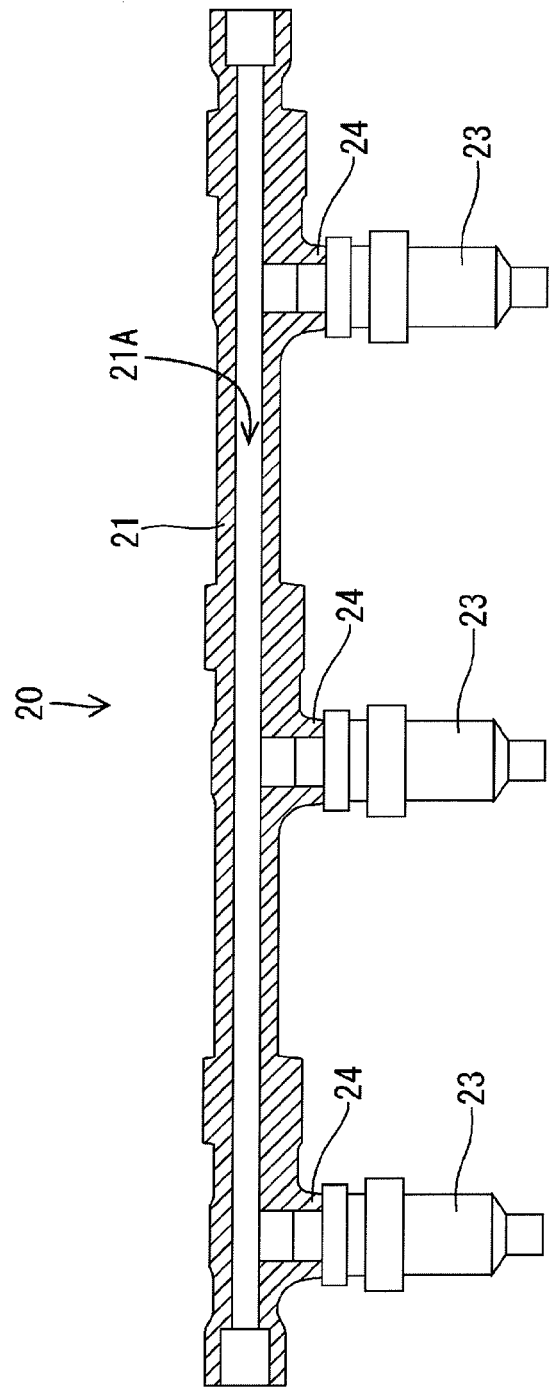
FIG. 4 is a longitudinal sectional view illustrating an inner configuration of the fuel delivery pipe.

A plurality of injector connecting portions 24 for connecting respective injectors 23 extend from the pipe body 21. The injector connecting portions 24 are arranged close to the respective bolt connecting portions 22. As illustrated in FIG. 4, each injector connecting portion 24 has a cylindrical shape with a hollow therein. The hollow of the injector connecting portion 24 has a downwardly opening end and an end communicating with a fuel path 21A. The fuel path 21A runs through the axis of the pipe body 21. With these configurations, fuel is sent into the fuel path 21A, is delivered to the injector connecting portions 24, and is injected into the engine 13 through the injectors 23 connected to the injector connecting portions 24.

Figure 5:
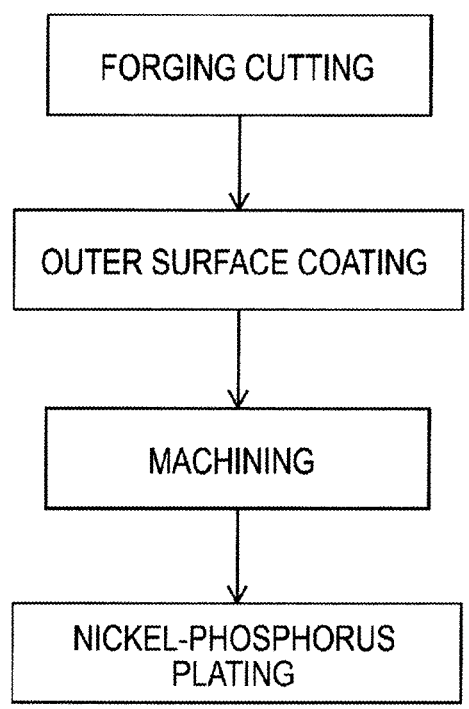
FIG. 5 is a flowchart illustrating a method of manufacturing the fuel delivery pipe of the embodiment.
Figure 6:
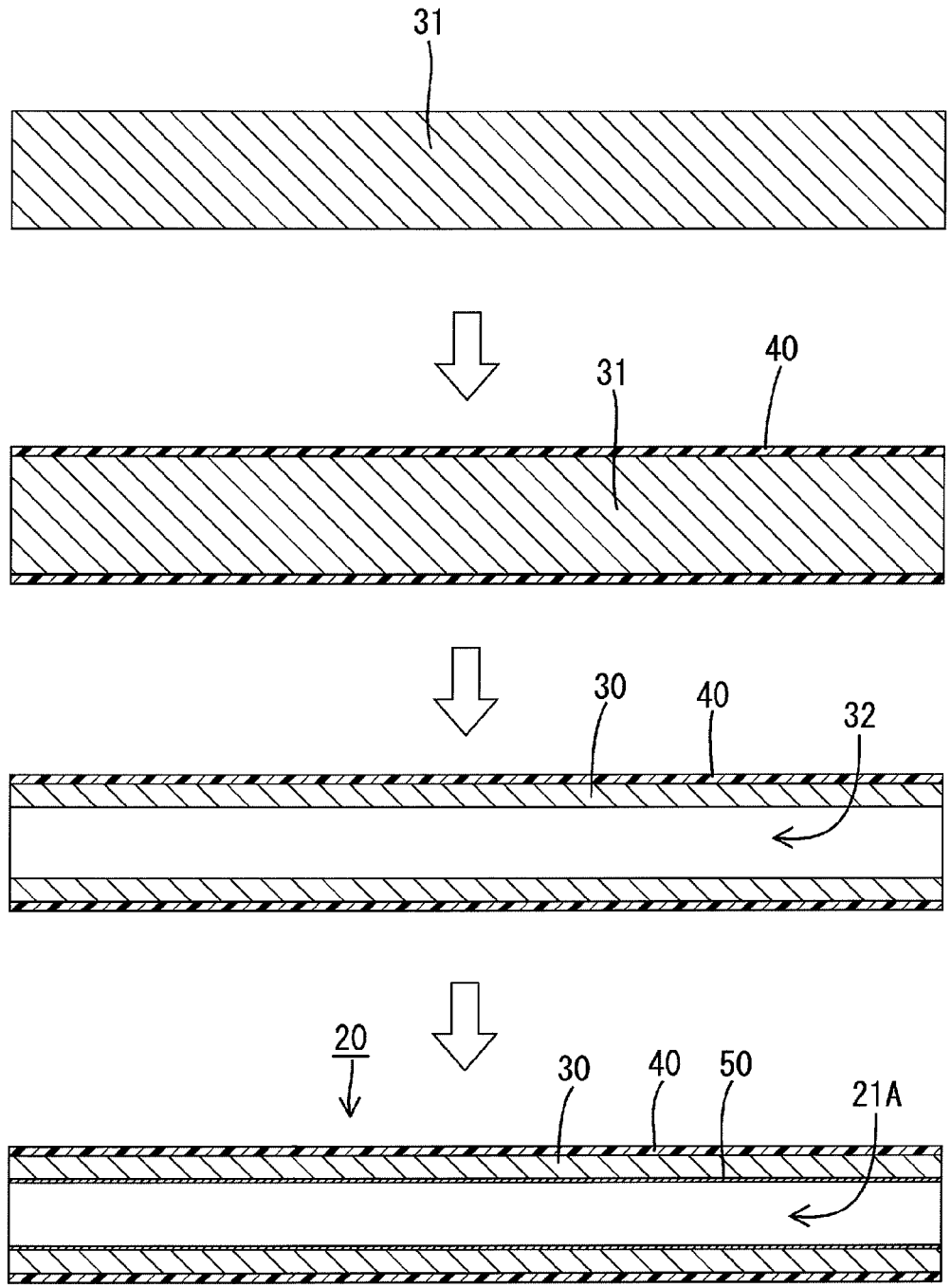
FIG. 6 is a simplified sectional view illustrating the method of the fuel delivery pipe of the embodiment.
Figure 7:
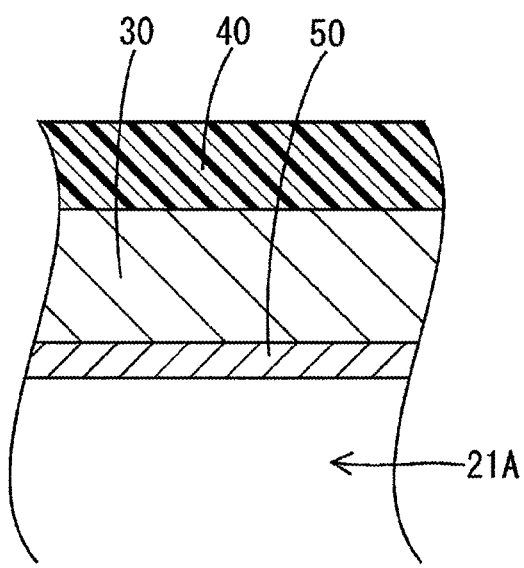
FIG. 7 is an enlarged partial sectional view illustrating the fuel delivery pipe completed in FIG. 6.
Figure 8:
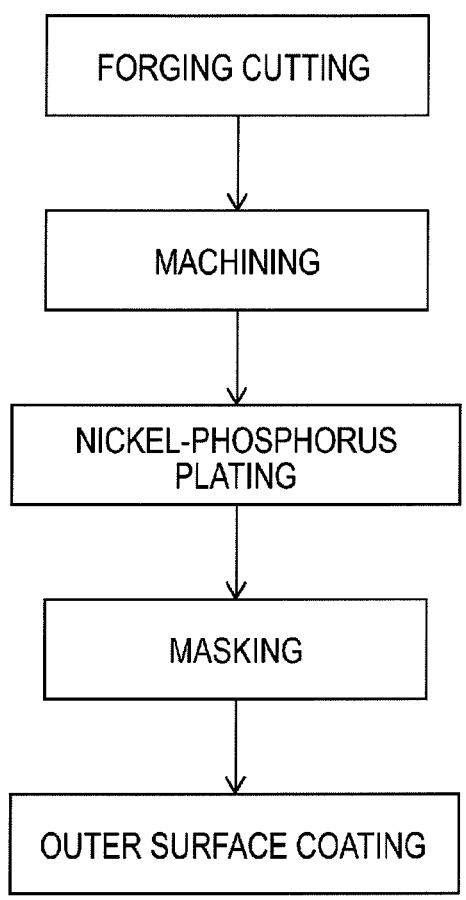
FIG. 8 is a flowchart illustrating a conventional method of manufacturing a fuel delivery pipe.
Figure 9:
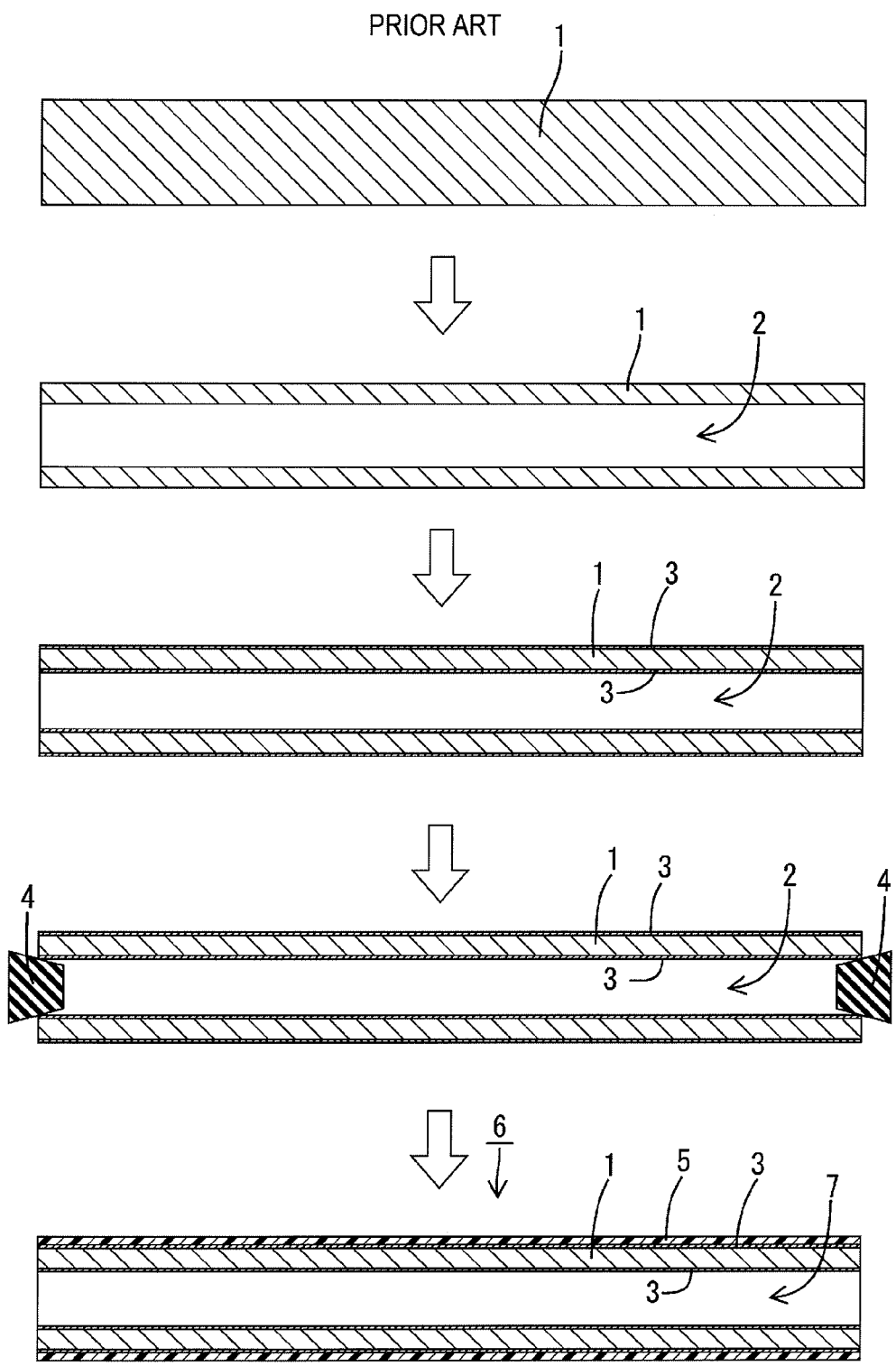
FIG. 9 is a simplified sectional view illustrating the conventional method of manufacturing the fuel delivery pipe.
Figure 10:
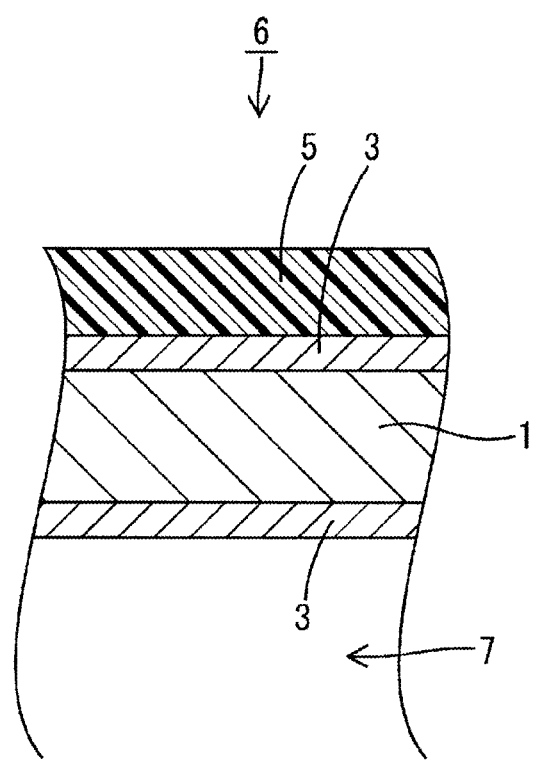
FIG. 10 is an enlarged partial sectional view illustrating the fuel delivery pipe completed in FIG. 9.

Next, a method of manufacturing the fuel delivery pipe 20 and an internal configuration thereof will be described with reference to FIGS. 5 through 7. FIGS. 6 and 7 are simplified sectional views illustrating the fuel delivery pipe 20, wherein the bolt connecting portions 22 and the injector connecting portions 24 are not illustrated. A crude metal 30 made of a forged iron configures most of the fuel delivery pipe 20. The crude metal 30 is formed of a forged iron rod as a base metal. As illustrated in FIG. 6, the rod is cut to a desired length so that a core metal 31 having a columnar shape is provided (a forging cutting step in FIG. 5).

Next, the core metal 31 is phosphatized. The phosphatized core metal 31 is then impregnated in epoxy resin electrodeposition paint and is cationically electrodeposited. By this cation electrodeposition coating, the outer periphery of the core metal 31 is directly coated with the paint film 40 (an outer-periphery coating step in FIG. 5). Because the outer periphery of the core metal 31 is a forged surface, the outer periphery is difficult to plate than a surface of a pressed sheet metal. Therefore, the cation electrodeposition coating is adopted in this embodiment. As a result of this, the paint film 40 having a greater and uniform thickness, good adhesion properties, and little pinholes is formed. Furthermore, because the paint film 40 is a resinous (nonmetal) film formed by the epoxy resin paint, no nickel-phosphorus plating layer 50 is formed on the paint film 40 even if the paint film 40 is not masked in a nickel-phosphorus plating step. The nickel-phosphorus plating step will be described later.

Next, the core metal 31 is drilled through its axis so that an open-ended bore 32 is formed throughout the inside of the core metal 31. By this drilling, the crude metal 30 having the open-ended bore 32 is provided (a machining step in FIG. 5). The crude metal 30 has a wall that defines the open-ended bore 32. Because this wall is a machined surface 33 formed by drilling, the wall is easier to plate than a forged surface. Therefore, a plating film having a uniform thickness and little pinholes is provided in the nickel-phosphorus plating step. The nickel-phosphorus step will be described below. The thickness of the paint film 40 is set at a thickness not to be pealed off even if the core metal 31 is fixedly held with a clamp etc. in the drilling. Specifically, the paint film 40 is approximately 10 to 20 μm thick. A measuring method by an electromagnetic thickness tester, a method of measuring masking step levels, etc. may be adopted to measure the film thickness.

Next, the crude metal 30 is impregnated in nickel-phosphorus plating solution and then is electroless plated. By this plating, a nickel-phosphorus plating layer 50 is formed on the machined surface 33 (a nickel-phosphorus plating step in FIG. 5). Preferably, the nickel-phosphorus plating layer 50 should be 8 to 30 μm thick. More preferably, the nickel-phosphorus plating layer 50 should be 10 to 20 μm thick. A measuring method by an electromagnetic thickness tester, a method of measuring masking step levels, etc. may be adopted to measure the layer thickness. Because no nickel-phosphorus plating layer 50 is formed on the paint film 40 as described above, the nickel-phosphorus plating layer 50 is formed only on the machined surface 33. By these steps, the fuel delivery pipe 20 is completed. The crude metal 30 has the fuel path 21A formed therein. The nickel-phosphorus plating layer 50 configures the inner periphery defining the fuel path 21A.

As illustrated in FIG. 7, the fuel delivery pipe 20 manufactured by the above-described steps has three layers composed of the nickel-phosphorus plating layer 50, the crude metal 30, and the paint film 40, in that order from the fuel path 21A. Thus, the nickel-phosphorus plating layer 50 is formed only on the portion that contacts the fuel passing through the fuel path 21A. Because of this, while nickel is one of rare metals, the fuel delivery pipe 20 needs a significantly less quantity of nickel. Furthermore, because the paint film 40 functions as a mask, no masking step is needed. As a result, the fuel delivery pipe 20 can be manufactured at lower cost.

Other Embodiments

The present invention is not limited to the above-described embodiment with reference to the drawings. For example, following embodiments also are included within the technical scope of the present invention.

(1) In the above-described embodiment, the method of manufacturing the fuel delivery pipe 20 is illustrated as a method of manufacturing a fuel system part. According to the present invention, the present invention may be adopted in a method of manufacturing the fuel tank 12, the fuel transfer pipe P1, P2, the fuel return pipe P3, etc.

(2) In the above-described embodiment, the drilling is illustrated as the machining. According to the present invention, boring may be adopted in the machining.

(3) In the above-described embodiment, the cation electrodeposition coating is adopted in coating the crude metal 30 with the paint film 40. According to the present invention, spray painting etc. may be adopted in forming a paint film.

(4) In the above-described embodiment, the shape of the fuel delivery pipe 20 is specifically illustrated in FIGS. 2 through 4. According to the present invention, the fuel delivery pipe may have, for example, four injector connecting portions.

The invention claimed is:

1. A method of manufacturing a fuel system part with a fuel path formed therein so as to pass fuel therethrough, the method comprising:

coating an outer surface of a metal member made of forged iron, with a nonmetal paint to form a nonmetal film;

machining the metal member with the nonmetal paint film formed thereon to form the fuel path and a machined surface as an inner surface of the metal member; and electroless plating the machined inner surface of the metal member in nickel-phosphorus plating solution to form a nickel-phosphorus plating layer on the machined inner surface.

2. The method according to claim 1, wherein
the nonmetal paint is an epoxy resin paint, and
the coating of the outer surface includes coating the outer surface of the metal member with the nonmetal paint by cation electrodeposition coating.

3. The method according to claim 1, wherein the machining of the metal member includes drilling the metal member.

4. The method according to claim 1, wherein the nonmetal paint is an epoxy resin paint.

\* \* \* \* \*